(12) United States Patent
Nakajima

(10) Patent No.: US 7,350,086 B2
(45) Date of Patent: Mar. 25, 2008

(54) CREATION OF IMAGE FILE

(75) Inventor: Yasumasa Nakajima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 544 days.

(21) Appl. No.: 10/467,497

(22) PCT Filed: Feb. 7, 2002

(86) PCT No.: PCT/JP02/01058

§ 371 (c)(1),
(2), (4) Date: Aug. 7, 2003

(87) PCT Pub. No.: WO02/065766

PCT Pub. Date: Aug. 22, 2002

(65) Prior Publication Data
US 2004/0066533 A1    Apr. 8, 2004

(30) Foreign Application Priority Data
Feb. 9, 2001    (JP)    ............... 2001-034522
Jun. 19, 2001   (JP)    ............... 2001-185190

(51) Int. Cl.
*H04L 9/30* (2006.01)
*G06F 3/12* (2006.01)
*G06F 13/00* (2006.01)

(52) U.S. Cl. .................. 713/193; 380/285; 348/207.1; 348/207.2; 348/231.6

(58) Field of Classification Search ............. 348/207.1, 348/207.2, 211.3, 231.6; 380/285, 30, 200, 380/201, 210, 211, 217; 713/193
See application file for complete search history.

(56) References Cited

U.S. PATENT DOCUMENTS

| 5,168,371 | A | * | 12/1992 | Takayanagi ................. 358/296 |
| 5,497,419 | A |   | 3/1996  | Hill |
| 5,512,977 | A | * | 4/1996  | Imai .......................... 399/366 |
| 5,646,994 | A |   | 7/1997  | Hill |

(Continued)

FOREIGN PATENT DOCUMENTS

EP    0 838 939    4/1998

(Continued)

OTHER PUBLICATIONS

Abstract of Japanese Patent Publication No. 11-088672, Pub. Date: Mar. 30, 1999, Patent Abstracts of Japan.

(Continued)

*Primary Examiner*—Emmanuel L. Moise
*Assistant Examiner*—Minh Dieu Nguyen
(74) *Attorney, Agent, or Firm*—Martine Penilla & Gencarella, LLP

(57) ABSTRACT

The technique of the present invention ensures generation of an image file, in which image data and additional data are included, with the confidentiality of specific data kept.

An image output system outputs the image data, which is generated in a digital still camera DSC 12, with a color printer 20. The DSC 12 encrypts image processing control data, which is preset by the manufacturer, and generates the image file, in which the image data and the encrypted image processing control data are included. The color printer 20 decodes the image processing control data included in the image file, performs image processing based on the image processing control data, and thereby outputs an image.

3 Claims, 11 Drawing Sheets

U.S. PATENT DOCUMENTS

| | | | |
|---|---|---|---|
| 6,282,362 B1 | 8/2001 | Murphy et al. | |
| 6,628,325 B1 * | 9/2003 | Steinberg et al. | 348/211.1 |
| 6,728,428 B1 | 4/2004 | Kinjo | |
| 6,750,902 B1 * | 6/2004 | Steinberg et al. | 348/211.3 |
| 6,888,943 B1 * | 5/2005 | Lam et al. | 380/268 |
| 7,085,377 B1 * | 8/2006 | Norr | 380/37 |
| 7,151,832 B1 * | 12/2006 | Fetkovich et al. | 380/210 |
| 7,177,429 B2 * | 2/2007 | Moskowitz et al. | 380/252 |
| 2001/0035909 A1 | 11/2001 | Kubo | |

FOREIGN PATENT DOCUMENTS

| | | |
|---|---|---|
| EP | 0 860 980 | 8/1998 |
| EP | 1 056 272 | 11/2000 |
| JP | 10-308870 | 11/1998 |
| JP | 11-088672 | 3/1999 |
| JP | 11-098461 | 4/1999 |
| JP | 11-122581 | 4/1999 |
| JP | 11-127415 | 5/1999 |
| JP | 11-308564 | 11/1999 |
| JP | 11-317863 | 11/1999 |
| JP | 2000-069277 | 3/2000 |
| JP | 2000-069419 | 3/2000 |
| JP | 2000-115688 | 4/2000 |
| JP | 2000-125186 | 4/2000 |
| JP | 2000-137806 | 5/2000 |
| JP | 2000-215379 | 8/2000 |
| JP | 2000-312296 | 11/2000 |
| WO | WO 01/06786 | 1/2001 |

OTHER PUBLICATIONS

Abstract of Japanese Patent Publication No. 11-127415 Pub. Date: May 11, 1999, Patent Abstracts of Japan.

Abstract of Japanese Patent Publication No. 2000-115688 Pub. Date: Apr. 21, 2000, Patent Abstracts of Japan.

Abstract of Japanese Patent Publication No. 10-334212, Pub. Date: Dec. 18, 1998, Patent Abstracts of Japan.

Abstract of Japanese Patent Publication No. 11-098461, Pub. Date: Apr. 9, 1999, Patent Abstracts of Japan.

Abstract of Japanese Patent Publication No. 11-308564 Pub. Date: Nov. 5, 1999, Patent Abstracts of Japan.

Abstract of Japanese Patent Publication No. 11-317863 Pub. Date: Nov. 16, 1999, Patent Abstracts of Japan.

Abstract of Japanese Patent Publication No. 2000-069277 Pub. Date: Mar. 3, 2000, Patent Abstracts of Japan.

Abstract of Japanese Patent Publication No. 2000-069419 Pub. Date: Mar. 3, 2000, Patent Abstracts of Japan.

Abstract of Japanese Patent Publication No. 2000-125186 Pub. Date: Apr. 28, 2000, Patent Abstracts of Japan.

Abstract of Japanese Patent Publication No. 2000-137806, Pub. Date: May 16, 2000, Patent Abstracts of Japan.

Abstract of Japanese Patent Publication No. 2000-215379 Pub. Date: Apr. 4, 2000, Patent Abstracts of Japan.

Abstract of Japanese Patent Publication No. 2000-312296 Pub. Date: Nov. 7, 2000, Patent Abstracts of Japan.

Abstract of Japanese Patent Publication No. 10-308870, Pub. Date: Nov. 17, 1998, Patent Abstracts of Japan.

Abstract of Japanese Patent Publication No. 11-122581 Pub. Date: Apr. 30, 1999, Patent Abstracts of Japan.

* cited by examiner

Fig.5

| Preset No. | Set Value for Each Item | | | | | | | Suitable Scene |
|---|---|---|---|---|---|---|---|---|
| | Contrast | Brightness | Color Balance | Saturation | Sharpness | Registered Color | Noise Removal | |
| Preset 1 | Standard | Standard | Standard | Standard | Standard | OFF | OFF | Standard |
| Preset 2 | Slightly Lower | Slightly Brighter | Standard | Sligtly Lower | Slightly Lower | Flesh Color | OFF | Portrait |
| Preset 3 | Slightly Higher | Standard | Standard | Slightly Higher | Slightly Higher | Skyblue, Green | OFF | Landscape |
| Preset 4 | Standard | Dark | OFF | Standard | Slightly Lower | Red | ON | Sunset |
| Preset 5 | Standard | Dark | OFF | Standard | Standard | OFF | ON | Night View |
| Preset 6 | Slightly Lower | Slightly Brighter | Low | Slightly Higher | Standard | Green | OFF | Flower |
| Preset 7 | Standard | Standard | Low | Standard | High | OFF | OFF | Macro |
| Preset 8 | Hard | Standard | Standard | Slightly Higher | High | OFF | OFF | Sports |
| Preset 9 | Slightly Lower | Bright | Standard | Standard | Standard | OFF | OFF | Backlight |
| Preset 10 | Standard | Standard | Standard | High | Slightly Higher | Red | OFF | Autumn |
| Preset 11 | Standard | Slightly Brighter | Standard | Standard | Slightly Higher | Flesh Color | OFF | Ceremonial Photograph |

| Offset | Description |
|---|---|
| 0 | Maker Name 00x0 |
| 6 | Reserve |
| 8 | Number of Local Tag Entries |
| 10 | Local Tag 1 |
| 22 | PrintMatching |
| ... | ... |
| 10+12*(N-1) | Local Tag N |

} 104

(b)

| Offset | Description |
|---|---|
| 0 | PrintMatching Identifier |
| 8 | PIM Version Information |
| 12 | Reserve |
| 14 | Number of Specified Parameters |
| 16 | First Parameter No. |
| 18 | First Parameter Setting Value |
| 22 | Second Parameter No. |
| 24 | Second Parameter Setting Value |
| 28 | Third Parameter No. |
| 30 | Third Parameter Setting Value |
| ... | ... |
| 16+6*(n-1) | n-th Parameter No. |
| 18+6*(n-1) | n-th Parameter Setting Value |

*Fig.8*

| Tag Name | Parameter Value | |
|---|---|---|
| ... | ... | |
| Gannma Value | 2.2 | ⎫ |
| Color Space | NTSC | ⎪ |
| Contrast | Slightly Lower | ⎪ |
| Brightness | Slightly Brighter | ⎬ Image Processing Control Data |
| Color Balance | Standard | ⎪ |
| Saturation | Slightly Lower | ⎪ |
| Sharpness | Slightly Lower | ⎪ |
| Registered Color | Flesh Color | ⎪ |
| Noise Removal | OFF | ⎭ |
| ... | ... | |

CREATION OF IMAGE FILE

TECHNICAL FIELD

The present invention relates to a technique of generating an image file, in which image data and additional data are associated one another.

BACKGROUND ART

A digital still camera (DSC) is configured to record an image in the digital data format using a CCD. A liquid crystal display mounted on the DSC allows a photographer to view and delete the image that has been shot. One applicable procedure using a general-purpose personal computer includes output of the image data, which has been shot by the DSC, such as displaying on a monitor and printing with a printer.

Respective DSCs have different characteristics in the color brightness or the color tone of a subject corresponding to a manufacturer and a type of a device. The difference depending on a type of an image output device causes such difference in the characteristics. In many cases, intentions of the photographer are not reflected on a resulting output image due to such difference.

Thus, the present invention provides a technique of utilizing the image file, in which image processing control data is added to the image data for controlling image processing. In the image file, a couple of shooting conditions, such as the shutter speed and the exposure time, are included. Such additional data, however, includes pieces of specific information that is uniquely set by each manufacturer of the DSC in order to present its own originality, which is undesired to be disclosed for the details. The image data itself is also undesired to be disclosed. As to the confidentiality regarding such data, nothing has been taken into consideration.

Those problems are discussed herein exemplifying the DSC; however, similar problems arise in an image data generation apparatus, such as a digital video camera and a scanner.

The object of the present invention is thus to provide a technique that ensures generation of the image file, in which the image data and the additional data are associated one another, with the confidentiality kept.

DISCLOSURE OF THE INVENTION

To attain at least part of the above and the other related objects, the present invention adopts the following structure.

In accordance with one aspect of the present invention, a first image file generation apparatus that generates an image file, in which image data and additional data of the image data are associated one another, comprises:

a data input module that inputs the image data and the additional data;

an encryption module that encrypts part of the image data and the additional data; and an image file generation module that generates the image file, in which the image data and the additional data are associated one another, part of the image file being encrypted.

The image file generation apparatus of the present invention enables generation of the image file, in which the image data and the image additional data of the image data are associated one another. Association may include two forms; both data are integrally included and respective data is included in different files formally, in which a piece of information for associating both data one another is included in at least one of two files. The term "include" or "associate" in the specification means the former form in a narrow sense, and both the former and the latter forms in a broad sense. The image file in the Exif format includes, for example, both a storage area for the image data and a storage area for the additional data. The additional data includes, for example, image processing control data and image acquisition information.

The "image processing control data" herein is data for controlling the image processing that is performed on the image data by an image processing device. The image processing device functions to analyze this image processing control data and automatically set parameters for the image processing to be performed. This parameter, for example, includes parameters regarding "the contrast", "the brightness", "the color balance", "the saturation", "the sharpness", "the gamma value" and "the target color space". "The target color space" is a parameter that specifies the color space used for the image processing, based on the color space, such as a sRGB color space or a NTSC, which has been employed relating to generation of the image data. The image acquisition information on the DSC includes various shooting conditions, such as the shutter speed, exposure and aperture.

In general, each manufacturer of the image file generation apparatus uniquely sets such additional data, and the additional data is thus undesired to be disclosed. The details of the additional data are particularly concealed from any competitor in many cases. In accordance with the present invention, part of the image data and the additional data, for example, which is undesired to be disclosed without limitation, is encrypted. As a result, the confidentiality of the additional data may be secured regarding the image file, in which the image data and the additional data are associated one another.

The image data may be encrypted in the present invention. For example, encryption of original image data of the image file, which includes thumbnails and the original image data, enables display of thumbnails, but prevents display of the original image, without being decoded.

In accordance with the present invention, not all but part of the image data and the additional data are encrypted, and thus, unencrypted data is available without being decoded. For example, when only the additional data is encrypted, an image output device, which is unable to decode the data, fails to utilize the additional data, but can output the image data.

In accordance with another aspect of the first image file generation apparatus, a diversity of cryptosystems may be applied to the encryption. One applicable example includes a secret key cryptosystem, in which a transmitter and a receiver share a key, while another applicable example includes a public key cryptosystem, in which a transmitter and a receiver use different keys. In the present invention, it is preferable to employ the public key cryptosystem, which uses the public key that is specified by the image processing device. The image file generation apparatus thus performs the encryption with the use of the specified public key. This system allows the encrypted data to be decoded only with the use of a decode key that pairs up with the corresponding public key, and thereby ensures the confidentiality of the image file generation apparatus between different manufacturers. Preparing one decode key enables the image processing device to match a plurality of image file generation apparatuses provided by different manufacturers.

In the case of the secret key cryptosystem using a common key, it is preferable to use different encryption keys depending on the manufacturer or the type of the image file generation apparatus. This system causes the image processing devices to hold decode keys, each of which corresponds to the manufacturer of the image file generation apparatus.

In accordance with yet another aspect of the first image file generation apparatus of the present invention, the additional data may include image processing control data used for the image processing on the image data, and the encryption module may encrypt at least the image processing control data.

This ensures the confidentiality regarding the image processing control data, which is uniquely set by the manufacture.

The present invention is also directed to a second image file generation apparatus that generates an image file, in which image data and additional data of the image data are associated one another, comprises:

an image data input module that inputs the image data;
an additional data input module that inputs the additional data, at least part of which is encrypted; and
an image file generation module that generates the image file, in which the image data and the additional data are associated, and at least part of which is encrypted.

In accordance with the present invention, the image file is generated using the additional data, at least one of which has been encrypted in advance. This ensures the confidentiality regarding the additional data without installation of the encryption module in the image file generation apparatus.

A diversity of data may be included in the additional data in the present invention. For example, the additional data may be output control data that controls the output of the image on the image output device. One example of the output control data includes a printing instruction where a color printer is used as the image output device.

In accordance with the present invention, the image file generation apparatus may be applied to a diversity of the image data generation apparatuses, such as digital cameras. The digital camera may be a DSC or a digital video camera.

The present invention is also directed to an image processing device that performs specific image processing on image data. This embodiment and the image file generation apparatus as described are in a sub-combination relationship each other.

In accordance with one aspect of the present invention, the image processing device that performs the specific image processing on the image data, comprises:

an image file input module that inputs an image file, in which the image data is associated with the image processing control data used for the image processing on the image data, part of which is encrypted;
a decoder that decodes encrypted part of the image file; and
an image processing module that performs the specific image processing on the image data, based on the image processing control data.

The decoder stores a piece of information, such as a decode key that pairs up with the corresponding encryption key, which is required for decryption.

In accordance with another aspect of the present invention, the image processing device further comprises:

an image processing control data storage module that stores the image processing control data,
wherein the image processing module performs the specific image processing on the image data, based on the image processing control data stored in the image processing control data storage module when the encryption module fails to decode the encrypted part of the image file.

This enables the image processing on the image file that is unable to be decoded.

The image processing device of the present invention may be applied to diversity of image output devices, such as a color printer. It is not restricted to the color printer, but may be a monitoring device, such as a CRT display or a liquid crystal display.

The present invention is also attained by a computer readable recording medium in which at least part of the encrypted additional data is recorded. The additional data recorded in the recording medium thus enables the image file generation apparatus of the present invention to generate the image data.

In addition to the image file generation apparatus and the image processing device as discussed previously, the technique of the present invention may also be actualized by an image file generation method and an image processing method. The technique of the present invention is further achieved by a computer program attaining such a method, a recording medium in which such a computer program is recorded, and a data signal including such a computer program and being embodied in a carrier wave. Any of the diverse conversion processes may be applied selectively.

When the technique of the present invention is attained by the computer program or the recording medium in which such a computer program is recorded, the computer program may be the whole program for driving the image file generation apparatus and the image processing device or only the partial program for attaining the characterized functions of the present invention. Typical examples of the recording medium include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

BRIEF DESCRIPTION OF THE DRAWINGS

FIG. 5 shows parameters of image processing control data.

FIG. 7 shows the detail hierarchical structure of the image file 100.

FIG. 8 is a schematic diagram illustrating one example of data stored into a MakerNote data storage area 103.

BEST MODES OF CARRYING OUT THE INVENTION

Some modes of carrying out the invention are discussed below as embodiments in the following order:
A. Construction of Image Output System:
B. Image File Generation Apparatus:
C. Structure of Image File:
D. Generation of Image File:
E. Image File Generation Apparatus in accordance with Second Embodiment
F. Image Output Device:
G. Image Processing on Image Output Device:
H. Modifications:

A. Construction of Image Output System

Figure 1:
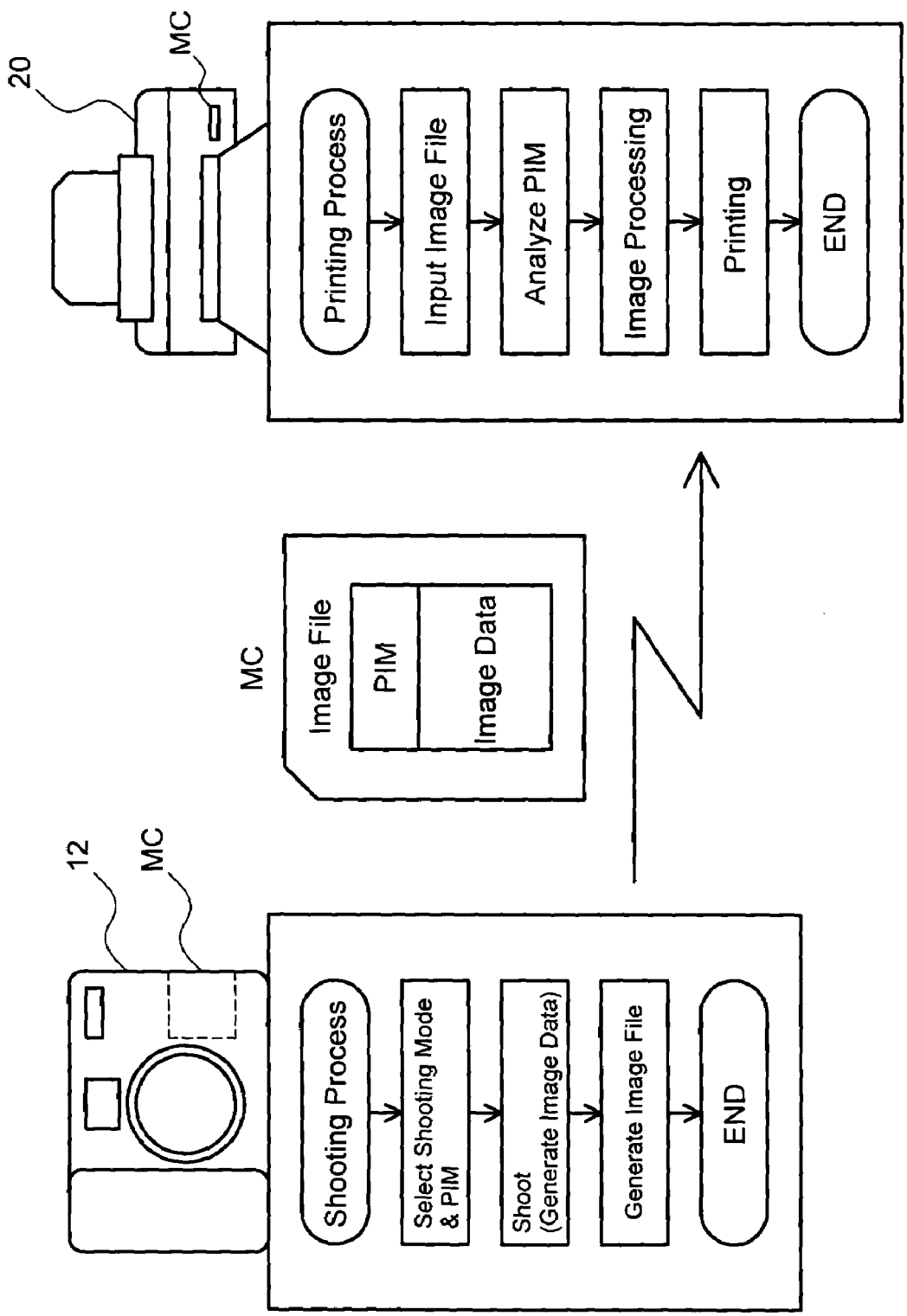
FIG. 1 schematically illustrates the construction of an image output system 10.

FIG. 1 schematically illustrates the construction of an image output system 10 in one embodiment of the present invention. The image output system 10 of the prevent invention includes a DSC 12 and a color printer 20. The DSC 12 is used as an image file generation apparatus. The color printer 20 is used as an image processing device and an image output device.

The DSC 12 functions to set various shooting conditions, shooting modes and output control data PIM. Available example of the shooting condition includes the condition for acquiring the image data, such as the shutter speed, exposure and aperture. The "shooting mode" is a group of parameter values that is set based on various shooting scenes. Once the user selects the shooting mode, each parameter value, such as the shutter speed, is automatically set. The output control data PIM is data required to control image processing and printing with the color printer 20, and includes image processing control data used for the image processing and a printting instruction. The DSC 12 does the shooting under the shooting condition, which is set by the user, and generates an image file, in which the image data and the output control data PIM are integrally included. A resulting image file is stored into a memory card MC.

The color printer 20 has a function of image processing. The color printer 20 receives input of the image file via the memory card MC or a cable, and then analyzes the output control data PIM. The color printer 20 performs the image processing on the image data, based on the image processing control data, which is included in the output control data PIM, and thereby executes the printing.

As mentioned above, the image output system 10 in accordance with the present invention controls the printing with the color printer 20 to execute the printing that reflects the intention of the photographer. The details about the DSC, the image file and the color printer will be discussed below.

Figure 2:
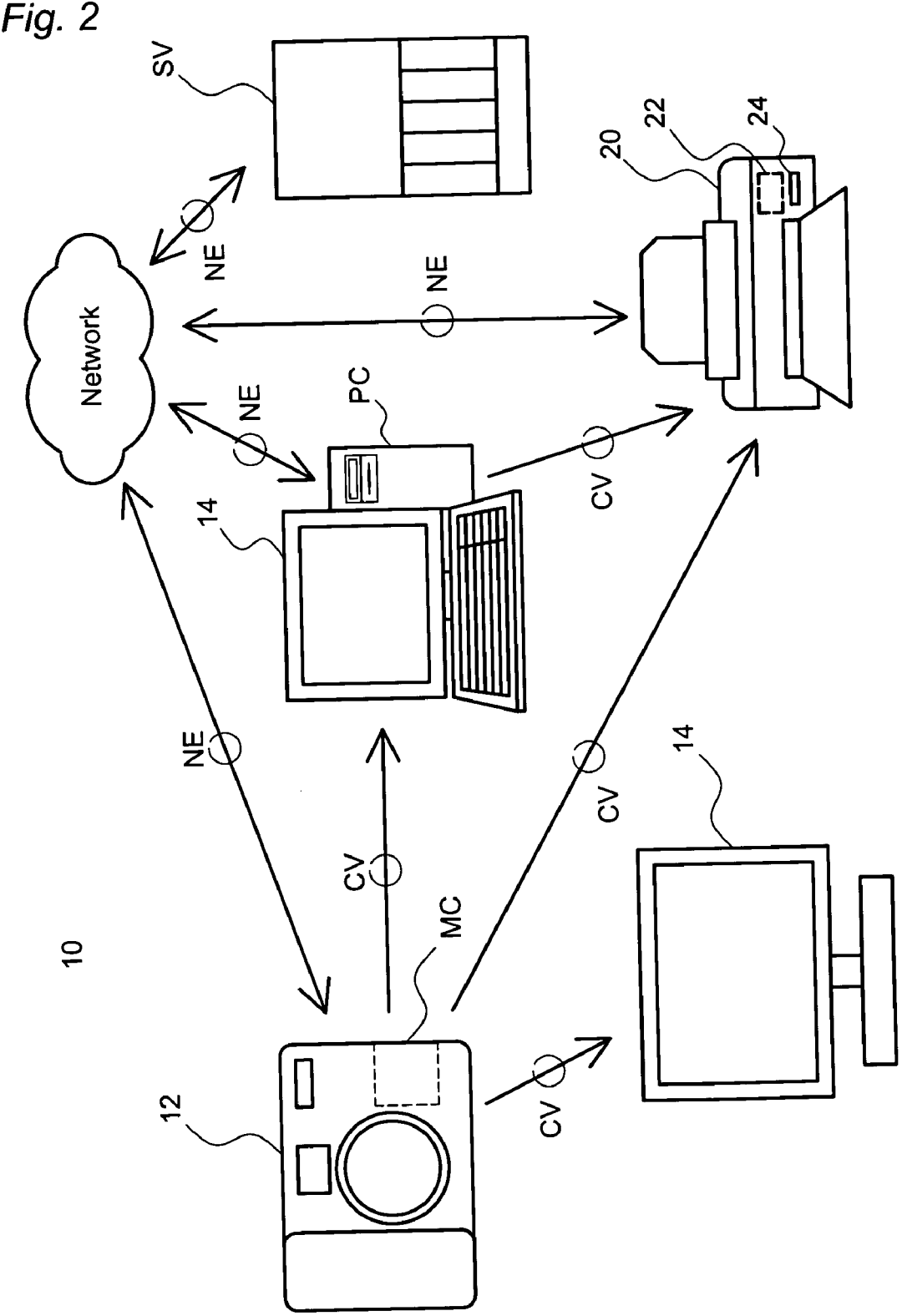
FIG. 2 shows modifications of an image output system 10.

A diversity of embodiments may be applied to the image output system 10. FIG. 2 shows modifications of the image output system 10. The image output system 10 may include a personal computer PC incorporating a function of the image processing, a server SV and a monitor 14 used as the image output device. A scanner and a digital video camera may also be connected to the system as the image file generation apparatus. Respective devices are connected together with a cable CV or a wireless communication locally or via a network in order to receive data.

B. Image File Generation Apparatus

Figure 3:
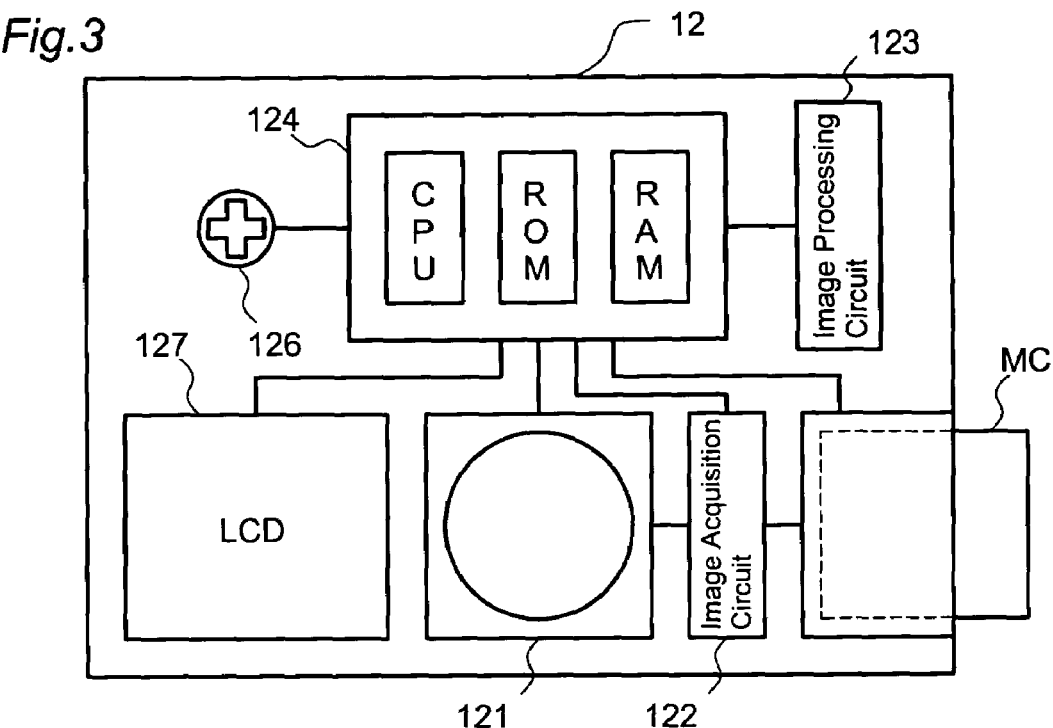
FIG. 3 is a block diagram illustrating the schematic structure of a DSC 12.

FIG. 3 shows functional blocks of the DSC 12. The respective functional blocks are actualized by software or hardware configuration.

The DSC 12 does the shooting with a CCD or a photomultiplier. The DSC 12 includes an optical circuit 121 having the CCD, an image acquisition circuit 122 controlling the optical circuit 121, an image processing circuit 123 causing the acquired digital image to be processed and a control circuit 124 having a CPU, ROM and RAM and controlling each circuit.

The DSC 12 stores the acquired image into the memory card MC as the digital data. A typical format for storing the image data is JPEG. Any other formats, such as TIFF, GIF and BMP, are also available.

The DSC 12 has a Select/Set-up button 126 for various settings of regarding the shooting mode and the image processing control data, and a liquid crystal display 127 for displaying an image preview window and a set-up window of every kind.

The "shooting mode" is a group of parameters, which is set corresponding to the shooting scene. This parameter, for example, includes parameters regarding the exposure time, the white balance, the aperture, the shutter speed and the focal length of lens or the like. Once the user selects the shooting mode, respective parameter values are automatically set corresponding to the selected shooting scene.

"The image processing control data" is data regarding the output of the image, such as the contrast, the brightness and the saturation, which is used for the image processing in the color printer 20. In this embodiment, plural sets of the image processing control data are preset corresponding to the shooting mode. The details about the relationship between the shooting mode and the image processing control data will be discussed below.

Figure 4:
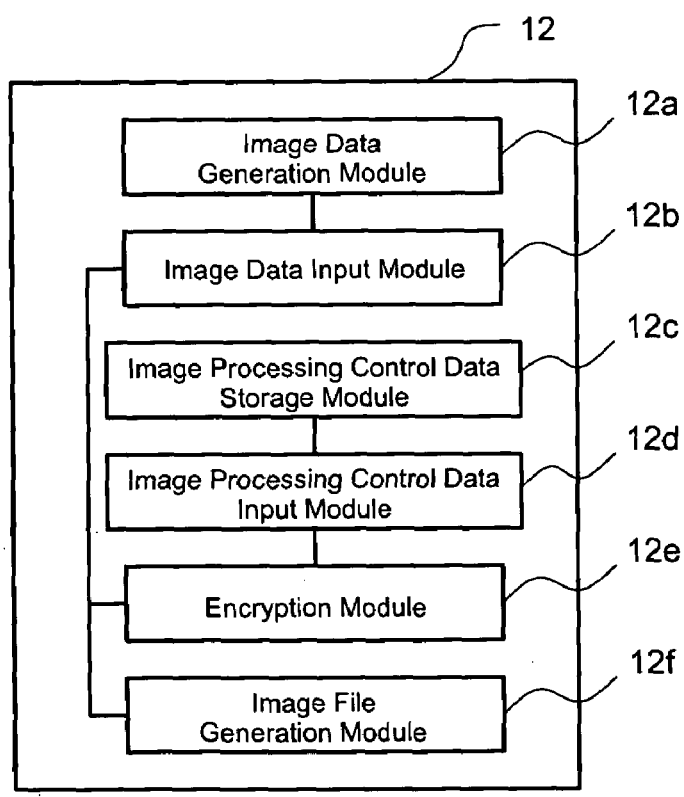
FIG. 4 shows functional blocks of a DSC 12.

FIG. 4 shows functional blocks of the DSC 12 in accordance with the first embodiment of the present invention. The respective functional blocks are actualized by software or hardware configuration.

An image data generation module 12a generates the image data. An image data input module 12b inputs the image data.

An image processing control data input module 12d inputs the image processing control data from an image processing control data storage module 12c. The image processing control data input module 12d acquires the image processing control data from an external storage unit, such as a hard disc of a personal computer PC, a server SV and a recording medium.

An encryption module 12e encrypts the image processing control data using a public key that is specified by the manufacture of the image processing device. A diversity of systems is available for encryption. In this embodiment, a public key cryptosystem known in the art is applied. A decode key is concealed by the manufacturer of the image file generation apparatus, and thereby ensure the confidentiality of the image processing control data between manufacturers of image file generation apparatuses.

An image file generation module 12f generates the image file, in which the image data and the encrypted image processing control data are stored in a specific format.

FIG. 5 shows image processing control data. In this embodiment, eleven sets of parameters are preset by the manufacturer of the DSC 12 corresponding to shooting scenes. Each set includes seven items of parameters, that is, "the contrast", "the brightness", "the color balance", "the saturation", "the sharpness", "the registered color" and "the noise removal". Those parameters are provided by the manufacturer of the DCS 12. The parameter and parameter values, which are applied to each shooting mode, are stored into ROM incorporated in the control circuit 124 in the DSC12. The user may set the shooting mode using the Select/Set-up button 126.

The DSC 12 generates the image file, in which the image processing control data corresponding to the additional data that is set, and the image data are integrally included, and then stores the resulting image file into the memory card MC. In addition to the image processing control data, the image file includes the shooting condition, such as the gamma value of the DSC 12, the target color space, the exposure time, the white balance, the aperture, the shutter speed and the focal length of lens.

C. Structure of Image File

Figure 6:
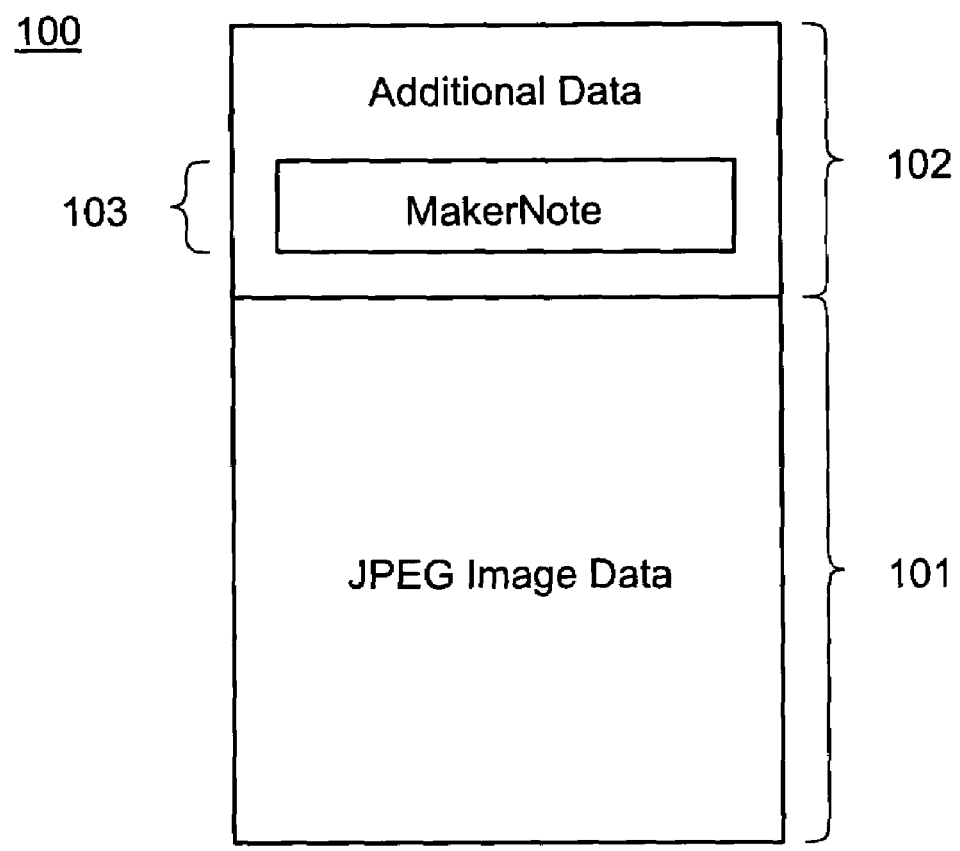
FIG. 6 shows the structure of an image file 100.

FIG. 6 shows the structure of an image file 100. According to this embodiment, the image file 100 adopts a specific file structure in conformity with the Exif (Exchangeable Image File) format standard for DSC. The Exif file specification was established by JEITA (Japan Electronics and Information Technology industries Association).

The image file 100 includes an image data storage area 101 and an additional information storage area 102. The image data is stored into the image data storage area 101 in the JPEG format. The additional information is stored into the additional information storage area 102 in the TIFF format. The additional information storage area 102 includes a MakerNote data storage area 103. The MakerNote data storage area 103 is undefined area left open to the manufacturer of the DSC 12. The image processing control data is stored into the MakerNote data storage area 103.

As known among those skilled in the art, the file in the Exif format has a data structure that utilizes a tag in order to specify each data. "MakerNote" is allocated to the data stored into the MakerNote data storage area 103 as a tag name, which is called a MakerNote tag.

Although the image file 100 is regarded as the file in the Exif format in this embodiment, it is not restricted to this format. The image file may have a data structure, in which the image data and the image processing control data are associated in any available format. The image data and the image processing control data may be integrally included in one file as shown in this embodiment, or may be formally included in different files. In the latter structure, at least one of both data preferably includes information that associates one another.

FIG. 7 shows the detail hierarchical structure of the image file 100. FIG. 7(a) shows the data structure of the Maker-Note data storage area 103. FIG. 7(b) shows the data structure of a PrintMatching data storage area 104, which is defined in the MakerNote data storage area 103. PrintMatching data is used as the image processing control data.

The data stored into the MakerNote data storage area 103 may be identified with the tag. The PrintMatching tag is allocated to the image processing control data therein. Each tag in the MakerNote data storage area 103 is specified with the pointer based on an off-set value from the top address in the MakerNote data storage area 103. Pieces of information regarding a name of the manufacturer (6 bites), a reservation area (2 bites), the number of the entries in the local tag and offset of each local tag (12 bites) are sequentially stored into the MakerNote data storage area 103. The end code "00×0", which indicates the end of the data, follows the name of the manufacturer.

An identifier PrintMatching in the PrintMatching data storage area 104 indicates that the parameter PrintMatching is stored. A parameter specification number indicates how many parameters are specified. A parameter number stores the value that specifies (identifies) the parameter number allocated to each parameter in advance. Information regarding a set-up value of the parameter includes set-up value of the parameter corresponding to the specified parameter number. In one example, the parameter number is data stored into a 2-byte area, while the set-up value of the parameter is data stored into a 4-byte area. The image output device may acquire the image processing control data by utilizing the PrintMatching tag as an index.

FIG. 8 is a schematic diagram illustrating one example of the data stored into the MakerNote data storage area 103. As shown in FIG. 8, the image processing control data, such as the gamma value, the color space, the contrast, the brightness, the color balance and the saturation, which is prepared by the manufacturer, may be stored into the MakerNote data storage area 103. Parameter values, which are shown in the hatched portion, are data encrypted by the encryption module 12e. Although all parameters of the image processing control data are encrypted in this embodiment, but it is also available to encrypt only part of the image processing control data.

D. Generation of Image File

Figure 9:
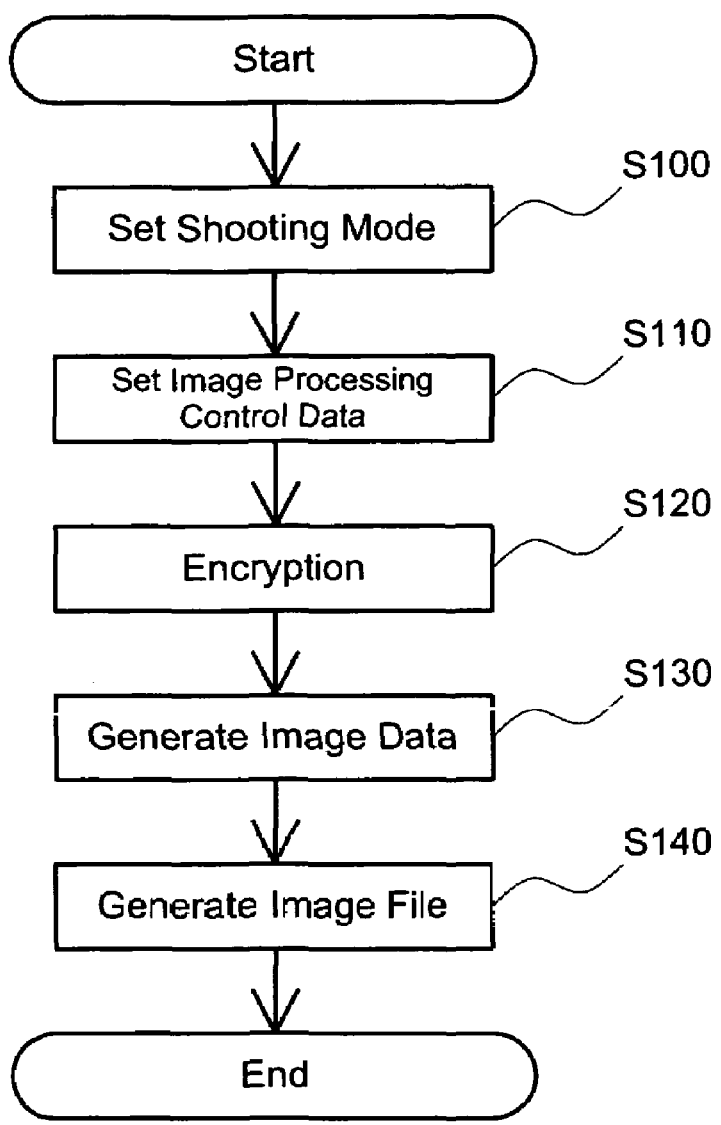
FIG. 9 is a flowchart illustrating the process of generating an image file 100 in accordance with the first embodiment.

FIG. 9 is a flowchart illustrating the process of generating the image file 100 in the DSC 12. The user sets the shooting mode prior to a shoot (Step S100). The shooting mode is selected among default shooting modes, which are displayed on a liquid crystal display 127, with the operation of the Select/Set-upbutton 126. A "full automatic mode" that allows the DSC 12 to set the parameter automatically, and a "manual mode" are also prepared. Once the shooting mode is set, each parameter is automatically selected based on the preset of the image processing control data, shown in FIG. 5 (Step S110).

The control circuit 124 encrypts those parameters (Step S120). At this step, the identifier, which indicates the encryption is processed, is attached to the encrypted parameter.

The control circuit 124 generates the image data in response to a shooting request, such as push of a shutter button (step S130), based on the use of parameters that are set (Step S130). The control circuit 124 then generates the image file 100, in which the image data and the image processing control data are included (Step S140). Finally, the control circuit 124 stores the resulting image file 100 into the memory card MC.

Performing the sequence of the above processing enables generation of the image file, which includes the encrypted image processing control data. It namely ensures the confidentiality of the image processing control data. The process of the encryption for the image processing control data in FIG. 9 is performed prior to the generation of the image data, but may also be performed after the generation of the image data.

In accordance with this embodiment, the image processing control data is set corresponding to the shooting mode, but may be set based on an image processing mode, which includes preset parameters in FIG. 5 separately from the shooting mode.

E. Generation of Image File in Second Embodiment

In accordance with the DSC 12 in the first embodiment, the encryption module 12e encrypts the image processing control data, which is stored into the image processing control data storage module 12c, and thereby generates the image file. The present invention is not restricted to this application, but may include an application that uses the image processing control data that has been encrypted in advance.

Figure 10:
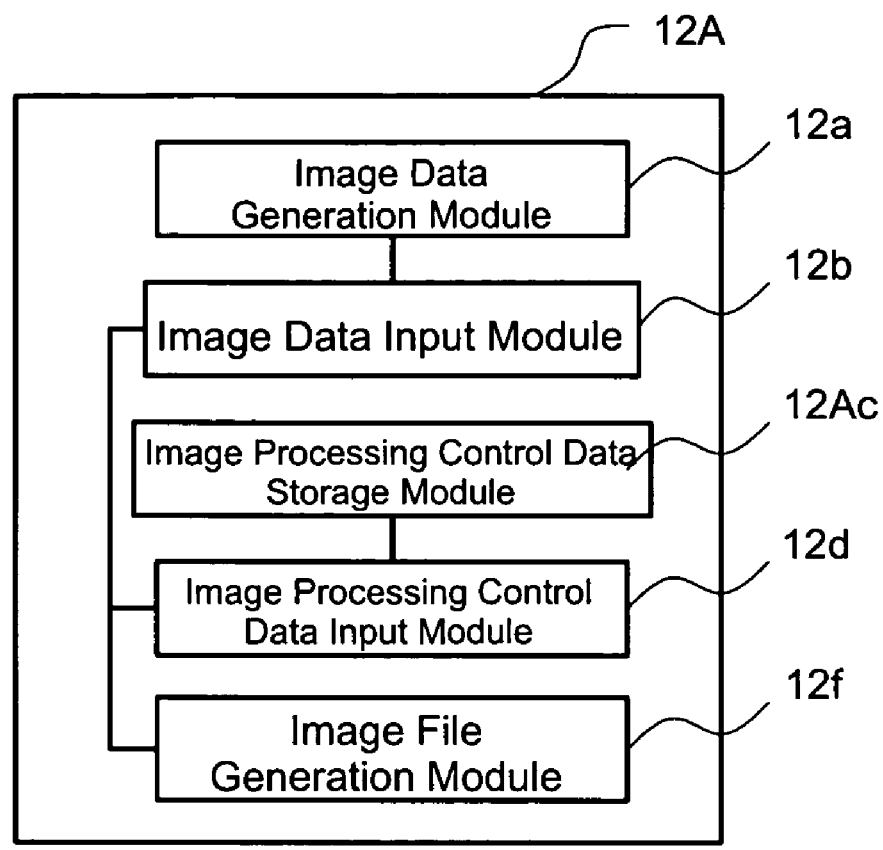
FIG. 10 shows functional blocks of a DSC 12A in accordance with the second embodiment.

FIG. 10 shows functional blocks of a DSC 12A in accordance with the second embodiment. The encryption module 12e, shown in FIG. 4, is not incorporated in the DSC 12A since the image processing control data storage module 12Ac has a function of storing the image processing control data that has been encrypted in advance. The DSC 12A may also have a encryption module to encrypt data other than the image processing control data.

According to the second embodiment, the process of the generation of the image file 100 on the DSC 12A is identical to that of the first embodiment, except that the process of the encryption at step S120 in FIG. 9 is skipped.

Similar to the image file generation apparatus of the first embodiment, the image file generation apparatus of the second embodiment may thus generate the image file, in which the image data and the encrypted image processing control data are included.

F. Image Output Device

The color printer 20 as an image output device will be discussed below. The color printer 20 is an ink-jet printer that functions to output a color image and form dot patterns by ejecting, for example, color ink consisting of seven color components; cyan (C), light cyan (LC), magenta (M), light magenta (LM), yellow (Y), dark yellow (DY) and black (K), into a printing medium to form the image. A diversity of printers, such as an electro photography printer, which transfers and fixates color toner on the printing medium to form the image, are also applicable.

A control circuit 22 in the color printer 20 functions to read out the image file 100 from the memory card MC that is inserted into a memory card slot 24, and decode and analyze the image processing control data with the use of the decode key. The control circuit 22 then peroforms the image processing based on the image processing control data that has been analyzed, and performs the printing.

G. Image Processing on Image Output Device

Figure 11:
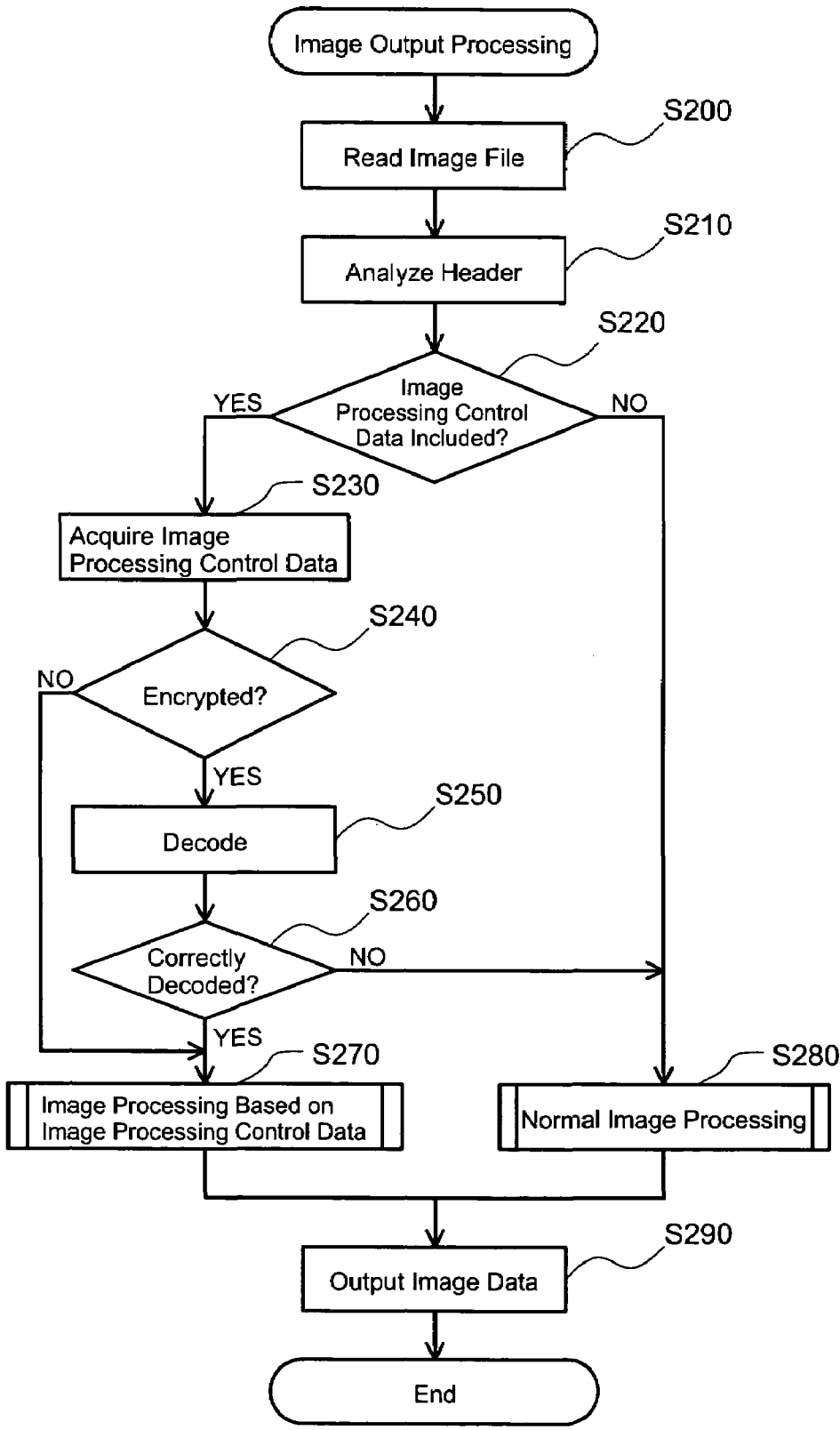
FIG. 11 is a flow chart illustrating the image processing routine.

FIG. 11 is a flow chart illustrating image output processing, which is performed by the CPU incorporated in the control circuit 22 on the color printer 20. Once the memory card MC is inserted into the memory card slot 24, the CPU reads out the image file 100 from the memory card MC and temporally stores the read image file 100 into RAM (Step S200). Then the CPU analyzes the header of the read image file 100 (step S210), and judges as to the presence or the absence of the image processing control data (step S220).

When the CPU detects no image processing control data, the CPU acquires the parameter value, which is stored into the ROM of the color printer 20 and thereby performs the image processing (Step S280).

When the CPU detects any image processing control data, the CPU acquires the detected image processing control data (Step S230). The CPU then judges as to whether or not the detected image processing data is encrypted (Step S240). The CPU may perform the judgment, for example, based on the identifier that indicates if the image processing control data is encrypted. When the data is encrypted, the decoding process is performed on the data using the decode key (Step S250), and the image processing is performed based on the image processing control data (Step S270). If the CPU fails to decode the data, the parameter value, which is stored into the color printer 20, is acquired from ROM, and the CPU performs normal image processing (Step S280). When the image processing control data is not encrypted at step S240, the CPU performs the image processing based on the image processing control data (Step S270).

The CPU finally prints out the processed image data (Step S290) and then terminates this processing routine.

Figure 12:
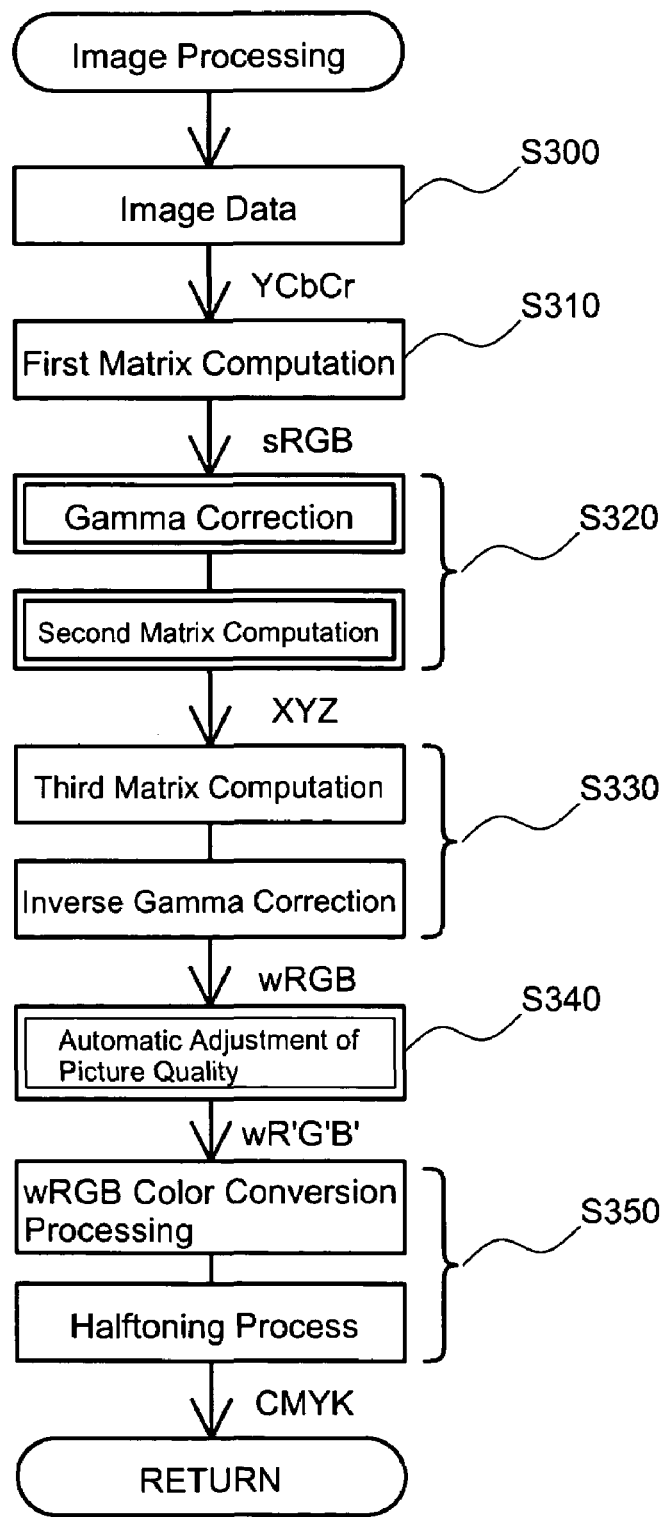
FIG. 12 is a flow chart illustrating image processing based on image processing control data.

FIG. 12 is a flow chart illustrating a sequence of the image processing at Step S270. A double line is added to indicate the processing where the image processing control data is used.

The CPU fetches the image data from the image file 100 (step S300).

As described above, the DSC 12 stores the image data into the file of the JPEG format, where the image data is stored with a YCbCr color space to keep high data compression ratio (Step S310).

The CPU executes a first matrix computation to convert the image data in the YCbCr color space into the image data in a sRGB color space (step S310).

The CPU then carries out a gamma correction and a second matrix computation on the resulting image data in the sRGB color space (step S320). In the process of the gamma correction, the CPU fetches the gamma value on the DSC 12 from the image processing control data, and thereby performs the process of the conversion of the gamma value into the fetched gamma value on the image data. The second matrix computation is applied to convert the image data in the sRGB color space into the image data in the XYZ color space. In accordance with this embodiment, the image file 100 may include color space information relating to the generation of the image data. When the image file 100 includes the color space information, the CPU refers to the color space information, and thereby carries out the second matrix computation applying the matrix corresponding to the color space relating to the generation of the image data.

The XYZ color space is applied to the image data after the procedure of the second matrix computation. The color space used for the image processing with printers or computers was conventionally fixed in the sRGB color space that prevented effective use of the color space applied in the DSC 12. Contrary to the conventional type, the printer of the present invention utilizes the color space of the DSC 12 to attain desirable color reproduction, and thereby changes the matrix, used for the second matrix computation, based on the information regarding the color space, which is included in the image file 100.

The CPU carries out a third matrix computation and an inverse gamma correction to convert the image data in the XYZ color space into the image data in the wRGB color space, and thereby performs the adjustment of the picture quality based on the image processing control data (step S330). The wRGB color space is defined to have the broader color range than the sRGB color space. In the process of the inverse gamma correction, the CPU fetches a default gamma value from ROM on the color printer 20, and thereby performs the process of the inverse gamma conversion on the image data, applying the inverse value of the fetched gamma value. The CPU carries out the third matrix computation applying the matrix included in ROM, which corresponds to the conversion into the wRGB color space.

The wRGB color space is applied after the procedure of the third matrix computation. As described above, the wRGB color space is defined to have the broader color range than the sRGB color space corresponding to the color space, which is generable by the DSC 12.

The CPU subsequently performs automatic adjustment of the picture quality of the image (step S340). In this embodiment, the CPU acquires each parameter value of the image processing control data, which is included in the image file 100, and thereby performs the automatic adjustment of the picture quality of the image, based on this parameter Once the automatic adjustment of the picture quality of the image is carried out, the CPU performs the process of the wRGB color conversion and halftoning for the printing (step S350). In the process of the wRGB color conversion, the CPU refers to a conversion lookup table (LUT) for converting into the CMYK color space that corresponds to the wRGB color space, which is stored into ROM, and thereby converts the wRGB color space into the CMYK color space. Namely, the image data with tone values of R, G, B is converted into, for example, the image data with tone values of seven colors; C, M, Y, K, LC, LM, DY.

In the process of the halftoning, the tone value conversion process is performed on the image data with receipt of the converted image data. In this embodiment, the converted image data is expressed as the data, each of which has 256-tone. Applicable examples of the process of the halftoning include the error diffusion method and the systematic dither method.

The CPU performs the process of resolution conversion prior to the process of the color conversion to match the resolution of the image data with that of the printing. In addition, the CPU performs an interlace providing process, which sorts data arrangement in the order of forwarding the image data, which is subjected to the halftoning process, to the color printer 20.

As mentioned above, the color printer 20 in this embodiment enables the image data in the image file 100, which is generated by the DSC 12, to be subjected to desirable image processing to be output.

Using the image processing control data included in the image file enables the picture quality of the image to be adjusted automatically without performing the adjustment of the picture quality on a photo retouch application or a printer driver.

Although examples of the above embodiment regard the automatic adjustment of the picture quality, the adjustment process of the picture quality may also be instructed with a picture quality automatic adjustment button, which is mounted on an operation panel in the color printer 20.

H. Modifications

All of the diverse series of image processing or part of them discussed in the above embodiment may be executed in a personal computer, or a server SV connected to a network. Providing the application for image data processing, such as the retouch application and the printer driver, with the image processing function as discussed in FIG. 12, attains the processing on the personal computer PC. The image file 100 generated in the DSC 12 is provided to the computer via the cable or the memory card MC. Upon activating the application on the computer by the user operation, the image file 100 is read, the image processing control data is analyzed, and the image data is converted and adjusted. The series of processing described above may also be performed with the automatic activation of the application in response to detection of the insertion of the memory card MC and the cable.

The image processing on the server SV is attained by installing the application in the server SV, which executes the image processing function with reference to FIG. 12. The server SV may receive the image file 100, perform the image processing that is specified based on the image processing control data and transmit the processed image file 100 or the image data to the personal computer PC of transmitter or the color printer 20 of destination. One applicable example of printing process without the computer includes the transmission of a global IP address of the color printer 20 and the image file from the DSC 12, which has a wireless communication facility, to the server SV, and the transmission of the processed image file 100 or the image data from the server SV corresponding to the transmitted global IP address in return.

It is also available to select a parameter for executing the automatic adjustment of the picture quality. For example, the color printer 20 may equip a parameter select button or a shooting mode parameter select button for selecting the shooting mode, in which specific set of parameters are preset suitable for the object of the shot. Alternatively, the parameter for performing the automatic adjustment of the picture quality on the user interface, such as the printer driver or the retouch application, may be selected where the automatic adjustment of the picture quality is performed on the personal computer.

Although the color printer 20 is used as the output device in a sequence of the above-mentioned embodiments, a display device, such as a CRT, a LCD and a projector, may also be utilized. In this case, an image processing program, which executes the image processing as discussed with reference to FIGS. 11 and 12, is performed on the display device as the output device. For example, when the CRT or the like functions as the display device on the computer, the image processing program is executed on the computer. It should be understood that final output image data has the format not in the CMYK color space but in the RGB color space.

In this case, user preference relating to the generation of the image data may be reflected on the displayed image on the display device, such as the CRT, in the similar manner of reflecting the user preference relating to the generation of the image data on the printing result with the color printer 20.

In one available example, the image file 100, used in this embodiment, is employed as the image file in capturing specific frame of the digital television broadcast, since such image data is in the format based on the YCbCr color space, and thus is applicable to this invention similar to the case of the DSC 12. To be more precise, the image file 100, in which the image data and the image processing control data is included, is generated by acquiring the scene to which the capture is instructed and setting the image processing control data corresponding to the acquired image data. As a result, the image with high saturation may be output in the case of the output of the image data, similar to the output of the color in the digital television broadcast.

Embodiments of the present invention described herein have been primarily directed toward the image file generation apparatus, the image output device, the image output system and the program; however, the above embodiment and its modifications are to be considered in all aspects as illustrative and not restrictive. There may be many modifications, changes, and alterations without departing from the scope or spirit of the main characteristics of the present invention.

Although parameters used in those embodiments as the image processing control data are, for example, the gamma value, the color space, the brightness and the sharpness, any parameter may be arbitrary used as the image processing control data.

In addition, respective parameters shown in FIG. 8 are to be considered as illustrative and not restrictive, and the invention is not to be limited to those values given herein. Furthermore, although any matrix value of the image processing in FIG. 12 has not been illustrated, it should be understood that those values may be changed depending on conditions, such as the color space to be targeted or the color space available for the color printer 20. It is also applicable to encrypt each element of the matrix since it is one of the image processing control data that influences on the image to be output.

In the first embodiment, encryption module 12e of the DSC 12 encrypts the image processing control data. The image file generation device in accordance with the present invention has a function of encrypting part of data, which is included in the image file. This application thus enables the encryption module 12e to encrypt other types of additional data, such as the image data and the shooting condition. For example, encrypting the image file, which includes thumbnails, only enables display of thumbnails on the image display device, but disables without display of the original image.

In addition, the public key cryptosystem is applied to the process of encryption in accordance with the first embodiment. The technique of the present invention is also attained in other systems, such as a secret key cryptosystem. In this case, the image processing device, which performs the processing on the resulting image file, may have decode keys, each of which corresponds to the encryption key that is prepared based on the manufacturer or the type of the device.

The DSC 12 has been discussed as the image file generation apparatus, however, a diversity of devices, such as a scanner and a video camera, may also be used. In the case of using the scanner, data information for acquiring the image file 100 may be selected on the computer PC, or may be selected on the scanner independently, using a preset button on the scanner, in which set-up information is allocated previously for setting information, and using a display screen and a set-up button on the scanner to be set arbitrarily.

The file in the Exif format has been discussed as the example of the image file 100 in the embodiment, however, the invention is not to be limited to the format given herein. The available image file may include the image data generated by the image data generation apparatus and the image processing control data that describes conditions for the output of the image data. Such a file requires no set-up regarding the condition of the image processing on the output device for each printing, and thereby immediately performs the image processing based on the specified condition regarding the image processing, so that the image data, which is generated by the image file generation apparatus, can be output from the output device after the automatic adjustment of the picture quality is performed adequately.

INDUSTRIAL APPLICABILITY

The present invention may be applied for generation of an image file, in which image data and additional data are associated one another.

The invention claimed is:

1. An image file generation apparatus for generating an image file, in which image data and additional data of the image data are associated with one another, comprising:
  a data input module that inputs the image data and the additional data;
  an encryption module that encrypts part of the additional data but does not encrypt the image data;
  an image file generation module that generates the image file, in which the image data and the additional data are associated with one another, with part of the additional data being encrypted and the image data not being encrypted, and
  a recording medium that stores the image file generated by the image file generation module,
  wherein the additional data includes at least one of image processing control data and shooting condition data, the image processing control data being used for image processing on the image data, the shooting condition data being indicative of a shooting condition of the image data,
  the image processing control data includes at least one of parameters regarding contrast, brightness, color balance, saturation, sharpness, gamma value, and target color space,
  the shooting condition data includes at least one of shutter speed, exposure, and aperture,
  the encryption module encrypts at least part of the image processing control data and the shooting condition data, and
  the image file generation module generates an image file including the image data and at least one of the encrypted part of the image processing control data and the encrypted part of the shooting condition data.

2. An image file generation apparatus in accordance with claim 1, wherein the encryption module encrypts data using a public key that is specified by an image processing device that performs specific image processing on the image data.

3. An image file generation apparatus in accordance with either claim 1 or 2,
  wherein the additional data includes output control data that controls output of the image on an image output device.

* * * * *